(12) United States Patent
Agrawal et al.

(10) Patent No.: US 12,147,728 B2
(45) Date of Patent: Nov. 19, 2024

(54) NETWORK MANAGED APPLICATION DUAL SCREEN SHARING BASED ON ASSOCIATING SEMANTIC INPUTS AND VIEWED VISUAL CONTENT

(71) Applicant: MOTOROLA MOBILITY LLC, Wilmington, DE (US)

(72) Inventors: Amit Kumar Agrawal, Bangalore (IN); Cai Zhiyi, Xiamen (CN); Olivier D Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/157,722

(22) Filed: Jan. 20, 2023

(65) Prior Publication Data

US 2024/0231740 A1    Jul. 11, 2024

(30) Foreign Application Priority Data

Jan. 10, 2023    (CN) .......................... 202310031583.3

(51) Int. Cl.
*G06F 3/14* (2006.01)
*H04L 67/104* (2022.01)
*H04L 67/141* (2022.01)

(52) U.S. Cl.
CPC .......... *G06F 3/1454* (2013.01); *H04L 67/104* (2013.01); *H04L 67/141* (2013.01)

(58) Field of Classification Search
CPC .... G06F 3/1454; H04L 67/104; H04L 67/141
See application file for complete search history.

(56) References Cited

U.S. PATENT DOCUMENTS

| 7,036,080 B1 * | 4/2006 | James | G10L 15/26 |
| | | | 715/728 |
| 8,510,381 B1 * | 8/2013 | Birand | G06Q 10/10 |
| | | | 709/204 |

(Continued)

FOREIGN PATENT DOCUMENTS

EP    4040277 A1    8/2022

OTHER PUBLICATIONS

Method and System for Automatically Sharing Content via Voice Commands with Embedded Focus Infusion, Jun. 25, 2019, 5 pages (Year: 2019).*

*Primary Examiner* — Yongjia Pan
(74) *Attorney, Agent, or Firm* — Isidore PLLC

(57) ABSTRACT

An electronic device, method, and computer program product support automatic sharing of a cross-view by a network device hosting a communication session for first and second communication devices. The first communication device presents first visual content that is selected by a first participant. The second communication device presents second visual content that is selected by a second participant. First semantic inputs by the first participant are communicated to the second communication device for presenting to the second participant. Second semantic inputs by the second participant are communicated to the first communication device for presenting to the first participant. In response to determining that the semantic input(s) are associated with the visual content, the network device communicates a duplicate copy of the first visual content to the second communication device and a duplicate copy of the second visual content to the first communication device, as a cross view to enhance discussion.

17 Claims, 14 Drawing Sheets

(56) References Cited

U.S. PATENT DOCUMENTS

| | | | | |
|---|---|---|---|---|
| 10,057,305 | B2* | 8/2018 | Woolsey | G06F 3/0484 |
| 10,275,204 | B2* | 4/2019 | Kim | H04L 67/10 |
| 11,089,134 | B1* | 8/2021 | Gordon | H04W 4/023 |
| 11,330,026 | B1 | 5/2022 | Han et al. | |
| 11,809,217 | B2 | 11/2023 | Balasubramanian | |
| 2006/0146765 | A1* | 7/2006 | Van De Sluis | G06F 3/016 |
| | | | | 370/338 |
| 2006/0187228 | A1 | 8/2006 | Jung | |
| 2010/0124906 | A1* | 5/2010 | Hautala | G06Q 10/10 |
| | | | | 455/412.1 |
| 2012/0088447 | A1 | 4/2012 | Kwahk | |
| 2014/0206348 | A1* | 7/2014 | Johnsson | H04W 8/005 |
| | | | | 455/434 |
| 2015/0073801 | A1* | 3/2015 | Shin | G06F 3/167 |
| | | | | 704/246 |
| 2015/0148128 | A1* | 5/2015 | Kim | A63F 13/60 |
| | | | | 463/31 |
| 2015/0350265 | A1* | 12/2015 | O'Brien | G06Q 10/1093 |
| | | | | 709/204 |
| 2017/0024100 | A1 | 1/2017 | Pieper | |
| 2017/0104818 | A1* | 4/2017 | Viggers | G06F 40/106 |
| 2017/0195202 | A1* | 7/2017 | Yamasaki | H04L 43/12 |
| 2018/0124570 | A1* | 5/2018 | Kannan | H04W 4/023 |
| 2018/0183596 | A1* | 6/2018 | Deshpande | H04W 12/03 |
| 2018/0191653 | A1* | 7/2018 | Aggarwal | H04N 21/84 |
| 2019/0340150 | A1* | 11/2019 | Kim | G06Q 50/10 |
| 2020/0296157 | A1* | 9/2020 | Jhanji | H04L 67/1091 |
| 2021/0227358 | A1* | 7/2021 | Hong | H04W 88/02 |
| 2022/0012074 | A1* | 1/2022 | Nishida | H04L 67/131 |
| 2022/0103603 | A1 | 3/2022 | Vendrow | |
| 2022/0155920 | A1* | 5/2022 | Behzadi | G06F 1/1694 |
| 2022/0350954 | A1* | 11/2022 | Tumbde | G06V 20/00 |
| 2022/0368742 | A1 | 11/2022 | Chang | |
| 2023/0117924 | A1* | 4/2023 | Bhayani | G06F 21/629 |
| | | | | 715/700 |
| 2023/0138804 | A1 | 5/2023 | Mao et al. | |
| 2024/0005046 | A1* | 1/2024 | Sharma | G06F 21/84 |
| 2024/0020138 | A1 | 1/2024 | Lv | |
| 2024/0103793 | A1 | 3/2024 | Tennee et al. | |

\* cited by examiner

NETWORK MANAGED APPLICATION DUAL SCREEN SHARING BASED ON ASSOCIATING SEMANTIC INPUTS AND VIEWED VISUAL CONTENT

CROSS REFERENCE TO FOREIGN APPLICATION

This application claims priority to Chinese Patent Application No. 202310031583.3, filed Jan. 10, 2023, the contents of which are fully incorporated by reference.

CROSS REFERENCE TO RELATED APPLICATIONS

The present application is related to two commonly owned U.S. patent applications filed on even date herewith to the same named inventors and entitled respectively: (i) Secure Peer-to-Peer Application Cross-View Screen Sharing (U.S. application Ser. No. 18/157,693); and (ii) Peer Managed Automated Dual Screen Sharing Based on Associating Semantic Inputs and Viewed Visual Content (U.S. application Ser. No. 18/157,730), the disclosures of all of which are hereby incorporated by reference in their entirety.

BACKGROUND

1. Technical Field

The present disclosure relates generally to communication devices that support peer-to-peer connection, and in particular to communication devices that support transceiving semantic content via a secure peer-to-peer connection.

2. Description of the Related Art

Electronic devices such as mobile phones, network servers, desktop workstations, laptops, and tablets are often used to participate in or to enable online human communication. A communication session involving participants using respective communication devices may enable an exchange of semantic content between the participants. The semantic content may take the form of spoken words, typed words, or gestured sign language, or other known gestures that are detected at a first communication device and presented at a second communication device. In addition to semantic content, visual content may be transmitted from one communication device to another, such as via screen sharing, providing a visual aid to a lecture or discussion. To ensure data privacy, each participant locally manages when to initiate screen sharing via a user interface at a corresponding communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
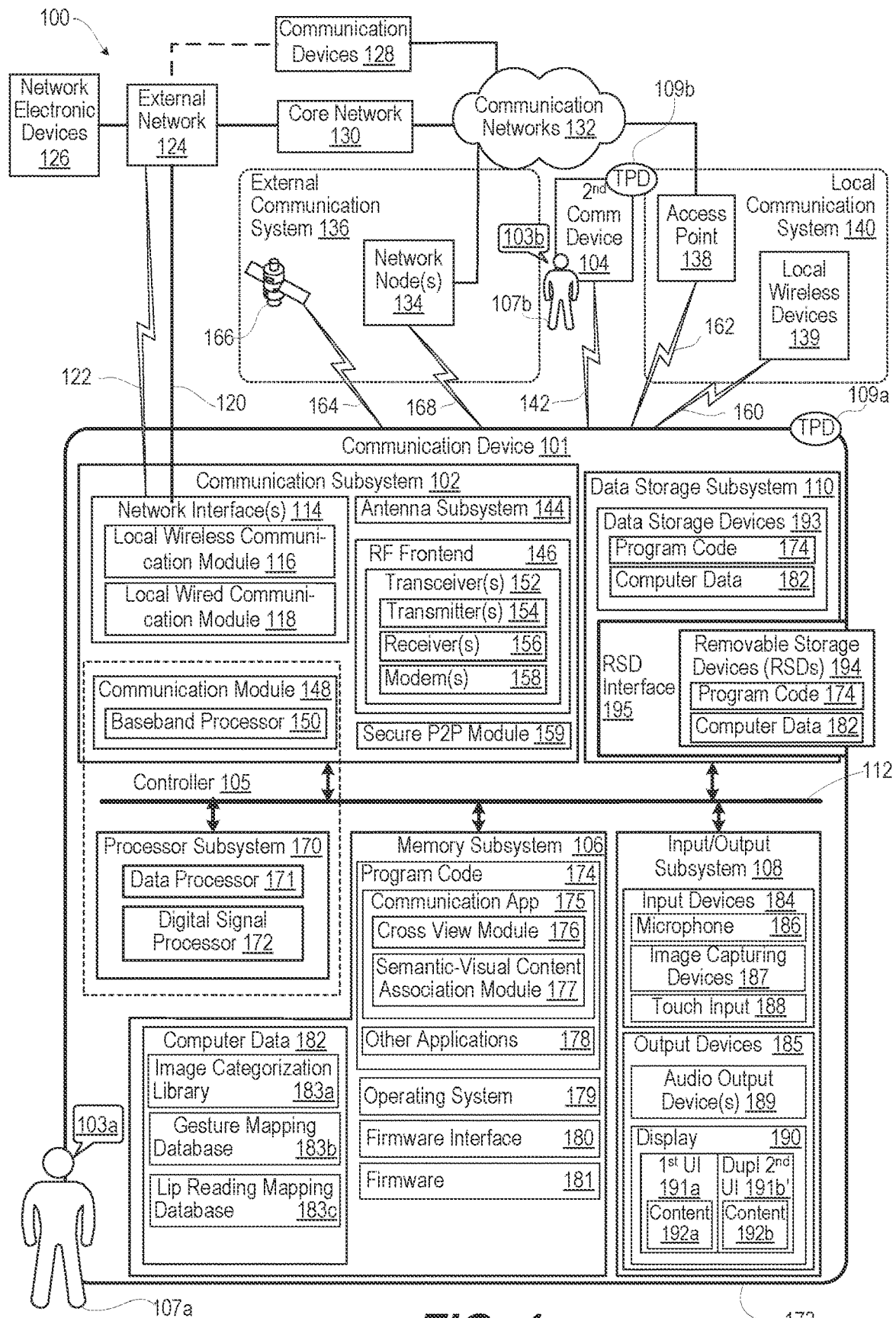
FIG. 1 depicts a functional block diagram of a communication environment including a communication device that selectively shares visual content in addition to exchanging semantic content with a second communication device, according to one or more embodiments.

According to aspects of the present disclosure, an electronic device, a method and a computer program product provides automatic cross-view screen sharing of visual content from a first device to a second device communicatively connected via a secure peer-to-peer connection such that opportunities are taken to enhance a discussion about a particular good, service, venue, etc., being viewed by at least one participant who provides semantic input. In an example, participants in an electronic communication session are each viewing respective alternative choices on respective devices and are discussing the alternatives using semantic inputs. In response to determining that a secure peer-to-peer connection is established between the devices, the controller of each device may present each participant with a cross view of visual content from both communication devices to enhance the conversation or discussion. In a first aspect of the present disclosure, automation of cross-view sharing is triggered in response to detection, by a network device hosting a communication session, of a cross-view context based on an association of what is being discussed using semantic inputs by participants with what has been selected to be viewed as visual content by the participants. In a second aspect of the present disclosure, automation of cross-view sharing depends on establishment of a secure peer-to-peer connection between devices, ensuring that a level of data privacy is maintained for other less secure communication connections. In a third aspect of the present disclosure, automation of cross-view sharing is triggered based on detection of the cross-view context by one of the electronic devices being used by a participant during a communication session.

In one or more embodiments, "cross-view context" is intended to encompass situations that are objectively appropriate for, or are subjectively determined to be, a situation in which a discussion or conversation would benefit from screen sharing between electronic devices that exchange discussion inputs. Cross-view context may be based on the nature of the communication session supporting the concurrent exchange of human-originating communication and human-selected visual content. Cross-view context may further be based at least in part of an association determined between the human-originating communication and the human-selected visual content. In one or more embodiments, the network device or electronic device alleviates the inconvenience or difficulty for users to recognize the cross-view context and to initiate screen sharing. The present disclosure provides for one or more "triggers" for cross-view sharing that are based at least in part on detecting the cross-view context. The associations between semantic inputs and visual content includes identifying types, characteristics, classifications and synonyms for what is being presented as visual content in order to find matches with what is being communicated as semantic inputs. Cross-view context may be determined at least in part based on a confidence level in the association between the semantic inputs and the visual content. The confidence level may be a function of a number of matches and how close the match is. In an example, a proper noun describing the visual content is a closer match than a mention of a category of object or thing that loosely encompasses the visual content. Cross-view context may have a confidence level based on combinations of matches of both participants to visual content selected by both participants.

In one or more embodiments, "semantic input" is intended to encompass any technique in which a person can communicate with another person. In an example, each person may speak one word of a plurality of words that are detected by a microphone. The other person hears the spoken word(s) reproduced at an audio output device such as a speaker. Examples of forms of communication that originate from one person or are reproduced for another person include: (i) hand gesture sign language; (ii) Morse code; (iii) lip synching; and (iv) haptic/touch communication such as Braille letters. Electronic devices may convert one form of communication into another form for the convenience or understanding of a receiving participant, including automated language translation.

In one or more embodiments, "visual content" is intended encompass any encapsulation of information that may be selected by and presented to a participation for consumption. The original consumer of the visual content is the user that selected the visual content, as contrasted with exchanging of semantic input that originates as human communication with one participant and is directed to another participant. An example of visual content includes webpages and electronic documents having text boxes, digital photographs, graphical data, tabular numeric data, drawings. Examples of visual content also include photographs, navigation queries for destinations, venues, businesses, and residences. Examples of visual content also include contact directories of persons, groups, associations and entities.

According to the first aspect of the present disclosure, a network device, a method and a computer program product provide network managed automated dual screen sharing between communication devices during a communication session, based on associating semantic inputs with visual content being viewed. The network device includes a communication subsystem connectable to a communication network. The network device includes a controller that is communicatively connected to the communication subsystem. The controller executes at least one application that configures the electronic device to provide the following functionality. The controller establishes, via the communication subsystem and the communication network, a communication session between a first electronic device and a second electronic device. During the communication session, the controller communicates, to the second electronic device, first semantic input received by at least one first input device of the first electronic device for presenting by at least one second output device of the second electronic device. The controller identifies first visual content selected via the at least one first input device and presented by at least one first user interface via at least one first output device of the first electronic device. In response to determining that the first semantic input is associated with the first visual content, the controller communicates a duplicate copy of the first user interface to the second electronic device for presenting the first user interface by the at least one second output device in addition to content locally presented on the second output device.

According to the second aspect of the present disclosure, an electronic device, a method and a computer program product support automatically selected cross-view screen sharing, based on using a secure peer-to-peer application. The electronic device includes a first display and includes memory that stores at least one application that presents user selectable visual content on a first user interface presented at the first display. The visual content can include an image, a text description, and/or graphical data. The electronic device includes a communication subsystem having a transceiver configurable by the at least one application for wireless communication using a secure peer-to-peer connection to exchange semantic inputs by participants during a communication session. A controller of the electronic device is connected to the first display, the memory, and the communication subsystem. The controller executes the at least one application to present the first user interface at the first display. The controller, via the communications subsystem, identifies the second communication device as providing a trusted peer device. The controller executes the at least one application to establish a secure peer-to-peer connection with the second communication device for exchanging semantic inputs such as spoken, typed, or gestured words. In response to determining that a secure peer-to-peer connection is established, via the communication subsystem, with a second electronic device that has a second display, the controller executes the at least one application to configure the electronic device to enable a cross-view mode with the second electronic device. The controller executes the at least one application that configures the electronic device to transmit a duplicate copy of the first user interface to the second electronic device for presenting at the second display. The controller executes the at least one application that configures the electronic device to receive, via the communication subsystem from the second electronic device, a duplicate copy of a second user interface being presented at the second display. The controller executes the at least one application to configure the electronic device to present, at the first display, the duplicate copy of the second user interface concurrently with the first user interface.

According to the third aspect of the present disclosure, an electronic device, a method and a computer program product support a communication application for automatic screen sharing between electronic devices during a communication session based on associating semantic inputs with visual content being viewed. The electronic device includes at least one first input device, at least one first output device, and a communication subsystem. A controller of the electronic device is communicatively connected to the at least one first input device, the at least one first output device, and the communication subsystem. The controller establishes, via the communication subsystem, a communication session with a second electronic device to facilitate a semantic communication exchange (i.e., a conversation or discussion) between the participants using the electronic device and the second electronic device. The controller presents a first user interface via the at least one first output device. The first user interface contains first visual content that is user selected via inputs received by the at least one first input device. The controller transmits, via the communication subsystem to the second electronic device, first semantic input received by the at least one first input device. In response to associating the first semantic input with the first visual content, the controller transmits a duplicate copy of the first user interface to the second electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of communication environment 100 in which the features of the present disclosure are advantageously implemented. In particular, communication environment 100 includes communication device 101, which is an example of an electronic device having communication subsystem 102 that selectively shares visual content in addition to exchanging semantic input 103*a*-103*b*, such as participating in a conversation or discussion, with second communication device 104 discoverable as trusted peer device 109*b* that is paired with first communication device 101 as trusted peer device 109*a*. Communication device 101 and second communication device 104 respectively receive the semantic content from participants 107*a*-107*b*. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communication subsystem 102, communication device 101 includes controller 105, memory subsystem 106, input/output (I/O) subsystem 108, and data storage subsystem 110 that are each managed by controller 105. System interlink 112 communicatively connects controller 105 with communications subsystem 106, memory subsystem 106, input/output subsystem 108, and data storage subsystem 110.

System interlink 112 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 112 are illustrated in FIG. 1, it is to be understood that more, fewer, or different interconnections may be present in other embodiments.

In one or more embodiments, communication subsystem 102 is configured to identify communication device 101 as trusted peer device (TPD) 109a to second communication device 104 that provides identification as TPD 109b to communication device 101. Communication subsystem 102 is configured to discover and establish secure peer-to-peer connections with second communication device 104. Communication subsystem 102 is configured to pair with other communication devices 128 discovered within proximity to communication device 101 according to authorizing control inputs. Once paired, subsequent discovery enables automatic secure peer-to-peer connections.

In one or more embodiments, communications subsystem 102 may include one or more network interfaces 114 such as local wireless communication module 116 and local wired communication module 118 to communicatively couple via network cable 120 or wireless connection 122 to external networks 124. Communication device 101, via external networks 124 may connect to network devices 126, second communication devices 128 and core networks 130 that support communication networks 132. Network interface(s) 114 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 106 may include additional functionality for communicating, using a cellular connection, with network node(s) 134 of external communication system 136 and for communicating, using a wireless connection, with wireless access point 138 or local wireless devices 139 of local communication system 140. Communications subsystem 106 may also wirelessly connect directly to trusted peer device 109b, such as via sidelink channel 142. Communications subsystem 106 includes antenna subsystem 144. Communications subsystem 106 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 105 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, communications subsystem 102 includes a secure peer-to-peer (P2P) module 159 provides functionality described herein for pairing communication device 101 to second communication device 104. Secure P2P module 159 may autonomously discover candidate devices for secure P2P pairing, generate user interface controls for authorizing pairing, wirelessly discovered previously paired devices, provide communication protocols for pairing, identifying, and automatically connecting with devices such as second communication device 104. Secure P2P module 159 may be incorporated into different hardware components that operate in a distributed or collaborative manner. Secure P2P module 159 may include trusted memory, or have access to trusted memory, to safeguard and secure trusted peer relationships with other devices such as second communication device 104. Implementation of secure P2P module 159 may use any known mechanism or process for doing so using integrated hardware and/or software, as known by those skilled in the art. Secure P2P module 159 may operate using one or more of the communication bandwidths and protocols described herein or known to those skilled in the art including communication using wired or over-the-air channels. Secure P2P module 159 may support encryption to secure a direct or an indirect communication channel to second communication device 104.

In one or more embodiments, controller 105, via communications subsystem 106, performs multiple types of cellular over-the-air (OTA) or wireless communication with local communication system 140. Communications subsystem 106 can communicate via an OTA connection 160 with local wireless devices 139. In an example, OTA connection 160 is a Bluetooth connection, or other personal access network (PAN) connection. In one or more embodiments, communications subsystem 106 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 106 receives downlink channels 164 from GPS satellites 166 to obtain geospatial location information. Communications subsystem 106 can communicate via over-the-air (OTA) cellular connection 168 with network node(s) 134.

Controller 105 includes processor subsystem 170, which includes one or more central processing units (CPUs), depicted as data processor 171. Processor subsystem 170 can include one or more digital signal processors 172 that are integrated with data processor 171. Processor subsystem 170 can include other processors that are communicatively coupled to data processor 171, such as baseband processors 150 of communication module 148. In one or embodiments that are not depicted, controller 105 can further include distributed processing and control components that are external to housing 173 or grouped with other components, such as I/O subsystem 108. Data processor 171 is communicatively coupled, via system interlink 112, to memory subsystem 106. In one or more embodiments, data processor 171 is communicatively coupled via system interlink 112 to communication subsystem 106, I/O subsystem 108, and data storage subsystem 110. Controller 105 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 106 stores program code 174 for execution by processor subsystem 170 to provide the functionality described herein. Program code 174 includes applications such as communication application 175 having cross view module 176 and semantic-visual content association module 177, and other applications 178. In one or more embodiments, several of the described aspects of the present disclosure are provided via executable program code of applications executed by controller 105. In one or more embodiments, program code 174 may be integrated into a distinct chipset or hardware module as firmware that operates separately from executable program code. Portions of program code 174 may be incorporated into different hardware components that operate in a distributed or collaborative manner. Implementation of program code 174 may use any known mechanism or process for doing so using integrated hardware and/or software, as known by those skilled in the art. Memory subsystem 106 further includes operating system (OS) 179, firmware interface 180, such as basic input/output system (BIOS) or Uniform Extensible Firmware Interface (UEFI), and firmware 181. Memory subsystem 106 includes computer data 182 such as image categorization library 183a used by semantic-visual content association module 177 to find word descriptions of visual objects. Memory subsystem 106 includes computer data 182 such as gesture mapping database 183b used by semantic-visual content association module 177 to find word description interpretation for one or more gestures made by user or participant 107a. Memory subsystem 106 includes computer data 182 such as lip reading mapping database 183c used by semantic-visual content association module 177 to find word description interpretation for one or more mouth movements made by user or participant 107a.

According to aspects of the present disclosure, semantic-visual content association module 177 determines a likelihood that at least one participant in a communication session is discussing, using semantic inputs 103a-103b, what is being presented as visual content 192a-192b at corresponding communication device 101a-101b. This association indicates that a cross-view sharing context exists, whereby enabling both communication devices 101a-101b to present visual content 192a-192b enhances the conversation or discussion. In an example, participants 107a-10b may be discussing different types of products, services, venues, navigation routes, people, hobbies, etc. Each participant may select, for presentation on a local user interface/display, an example of one of these items to propose to the other participant. As a picture may convey a significant amount of information, automatically accompanying the discussion with the visual content from the local user interface enhances the exchange of information in a nonintrusive way.

I/O subsystem 108 includes input devices 184 and output devices 185. Input devices 184 may include microphone 186, image capturing devices 187, and touch input devices 188. Output devices 185 may include audio output devices 189 and display 190. Display 190 presents local user interface (UI) 191a that includes first visual content 192a locally selected by first participant 107a. Display 190 may present remote UI 191b shared by second communication device 104 and which includes second visual content 192b remotely selected by second participant 107b.

Data storage subsystem 110 of communication device 101 includes data storage device(s) 193. Controller 105 is communicatively connected, via system interlink 112, to data storage device(s) 193. Data storage subsystem 110 provides program code 174 and computer data 182 stored on non-volatile storage that is accessible by controller 105. For example, data storage subsystem 110 can provide a selection of applications and computer data, such as communication application 175 and other application(s) 178. These applications can be loaded into memory subsystem 106 for execution by controller 105. In one or more embodiments, data storage device(s) 193 can include hard disk drives (HDDs), optical disk drives, and/or solid-state drives (SSDs), etc. Data storage subsystem 110 of communication device 101 can include removable storage device(s) (RSD(s)) 194, which is received in RSD interface 195. Controller 105 is communicatively connected to RSD 194, via system interlink 112 and RSD interface 195. In one or more embodiments, RSD 194 is a non-transitory computer program product or computer readable storage device. Controller 105 can access data storage device(s) 193 or RSD 194 to provision communication device 101 with program code, such as program code for communication application 175 and other application(s) 178, and with computer data 182 such as object image-semantic library 183.

Figure 2:
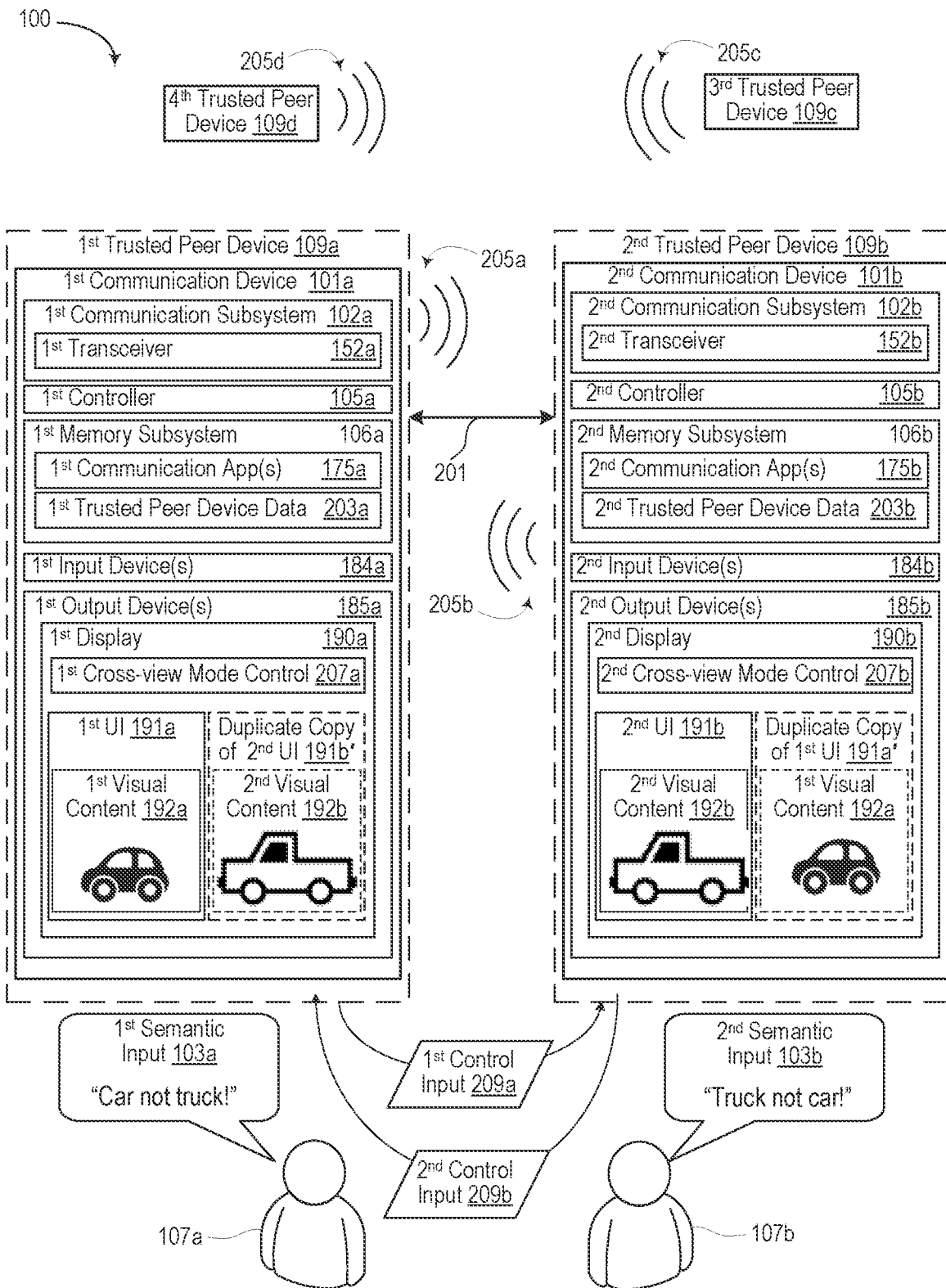
FIG. 2 depicts the communication environment having a secure peer-to-peer connection between first and second communication devices that share cross view visual content and exchange semantic content, according to one or more embodiments.

FIG. 2 depicts communication environment 100 that includes secure peer-to-peer connection 201 between first and second communication devices 101a-101b that share cross view visual content and exchange semantic input 103a-103b produced by participants 107a-107b. First communication device 101a may be similar or identical to communication device 101 of FIG. 1, including first communication subsystem 102a having first transceiver 152a, first controller 105a, first input devices 184a, first output device(s) 185a, including first display 190a, and first memory subsystem 106a, which stores first communication application(s) 175a and first trusted peer device data 203a. Second communication device 101b may be similar or identical to communication device 101 of FIG. 1, including having second communication subsystem 102b with second transceiver 152b, second controller 105b, second input devices 184b, second output devices 185b, including second display 190b, and second memory subsystem 106b, which stores second communication application(s) 175b and second trusted peer device data 203b.

First communication device 101a uses and updates first trusted peer device data 203a to recognize second communication device 101b as second trusted peer device 109b, enabling secure peer-to-peer connection 201. First communication device 101a may discover second and third, and fourth trusted peer devices 109b, 109c, and 109d that respectively broadcast identifying signals 205b, 205c, and 205d for pairing or automatic secure connection if previously paired. Similarly, first communication device 101a broadcasts identifying signal 205a that enables first communication device 101a to be discovered as first trusted peer device 109a by second communication device 104. Second communication device 104 as trusted peer device 109b uses and updates second trusted peer device data 203b.

First communication application(s) 175a, executed by first controller 105a, present, at first display 190a, first visual content 192a that is locally user selectable on first user interface ("UI") 191a. In one or more embodiments, first cross-view mode control 207a is presented at first display 190a, enabling automatic sharing of visual content during a secure peer-to-peer communication session. Second cross-view mode control 207b is presented at second display 190b, also enabling automatic sharing of visual content during a secure peer-to-peer communication session. In response to a control input to first cross-view mode control 207a and determining that secure peer-to-peer connection 201 is established, via first communication subsystem 102a, with second communication device 101b, first controller 105a enables a cross-view mode with second communication device 101b. First controller 105a, via first communication subsystem 102a, transmits a duplicate copy of first user interface 191a to second communication device 101b for presenting at second display 190b. First controller 105a, via first communication subsystem 102a, receives, via communication subsystem 102a from second communication device 101b, second user interface 191b that includes second visual content 192b that is remotely user selectable and is being locally presented at second display 190b. In an example, first controller 105a presents, at first display 190a, duplicate second user interface 191b' concurrently with first user interface 191a.

In one or more embodiments, first controller 105a monitors first input device(s) 184a for user interactions with second user interface 191b. In response to detecting a control input from first input device(s) 184a directed at/within second user interface 191b, first controller 105a transmits first control input 209a to second communication device 101b to prompt performance of a corresponding action by second communication application 175b at second communication device 101b.

In one or more embodiments, in response to receiving, via first communication subsystem 102b from second communication device 101b, second control input 209b directed to first user interface 191a being presented at second display 190b, first controller 105a prompts first communication application 175a to perform an action corresponding to second control input 209b. Second communication device 101b receives second control input 209b from second input device(s) 184b.

Figure 3A:
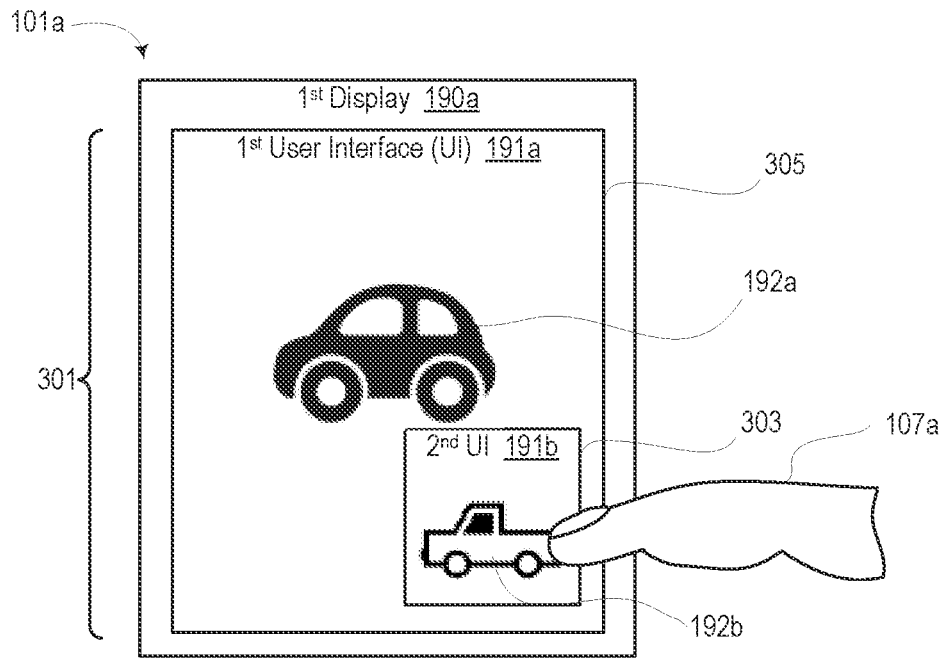
FIG. 3A is a front view of a first display of the communication device of FIG. 1 presenting a picture-in-picture cross view of first and second visual content, according to one or more embodiments.
Figure 3B:
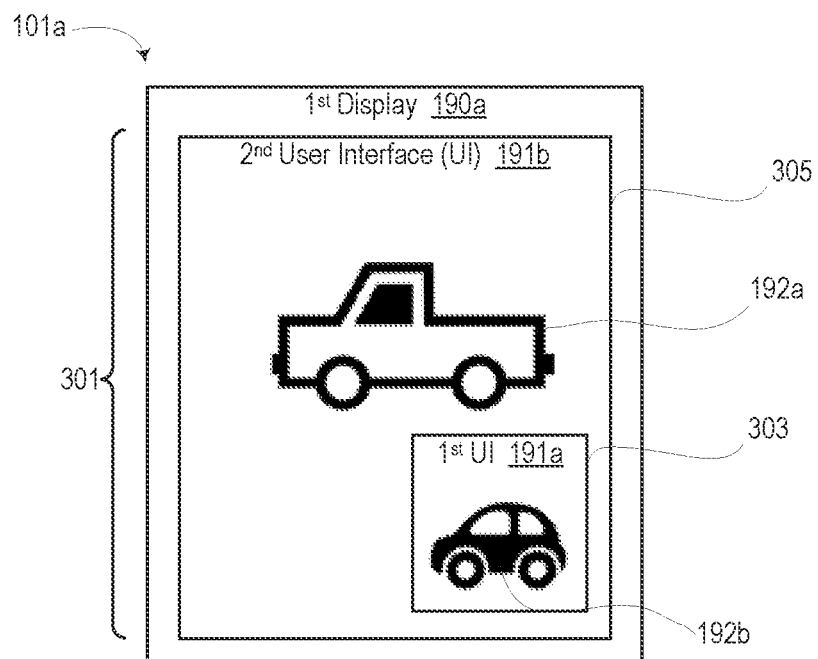
FIG. 3B is a front view of the first display of the communication device presenting a picture-in-picture with a switched cross view of the first and the second visual content, according to one or more embodiments.

FIG. 3A is a front view of first display 190a of first communication device 101a presenting picture-in-picture cross view 301 having insert foreground presentation 303 of second UI 191b containing second visual content 192b over a portion of main background presentation 305 of first UI 191a containing first visual content 192a. Participant 107a may interact with picture-in-picture cross view 301, such as swapping first and second visual content 192a-192b. In an example, FIG. 3B is a front view of first display 190a of first communication device 101a presenting picture-in-picture cross view 301 having insert foreground presentation 303 of first visual content 192a over a portion of main background presentation 305 of second visual content 192b. Picture-in-picture cross view 301 is an example of supporting cross view within a constrained spatial area of first display 190a.

Figure 4A:
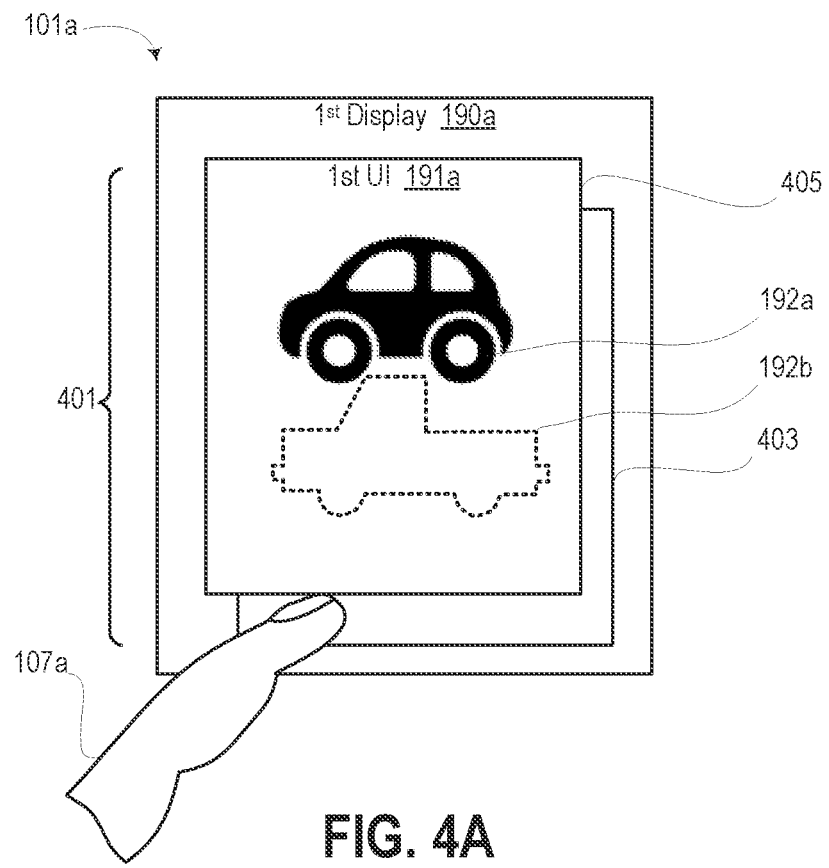
FIG. 4A is a front view of a first small display of the communication device presenting a cascaded cross view with visible first visual content, according to one or more embodiments.
Figure 4B:
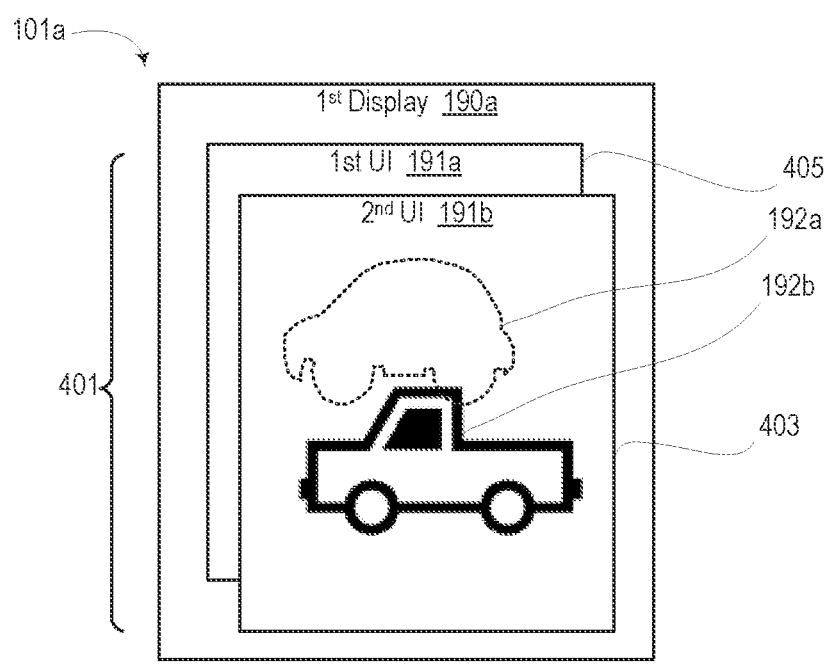
FIG. 4B is a front view of a first small display of the communication device presenting a cascaded cross view with visible second visual content, according to one or more embodiments.

FIG. 4A is a front view of first display 190a of first communication device 101a presenting cascaded cross view 401 of first and second visual content 192a-192b. Cascaded cross view 401 has lower right presentation 403 of second UI 191b containing second visual content 192b mostly overlaid by top left presentation 405 of first UI 191a containing first visual content 192a. Participant 107a may interact with cascaded cross view 401, such as selecting a different one of bottom right presentation 303 and top left presentation 305 to be on top. In an example, FIG. 4B is a front view of first display 190a of first communication device 101a presenting cascaded cross view 401 having insert bottom right presentation 403 moved to the top to expose second UI 191b containing second visual content 192b that now overlays top left presentation 305 of first UI 191a containing first visual content 192a. Cascaded cross view 401 is an example of supporting cross view within a constrained spatial area of first display 190a.

Figure 5A:
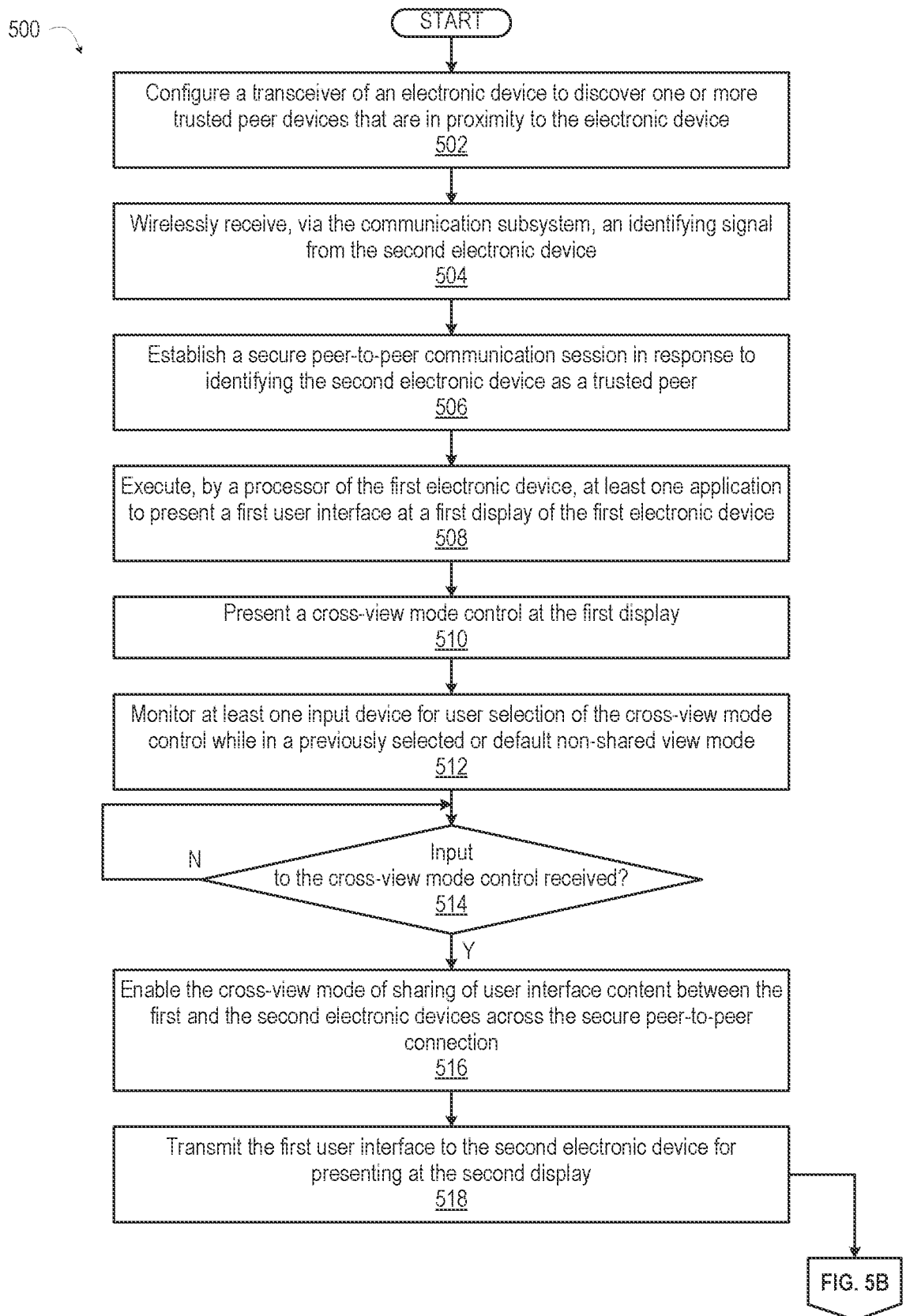
FIGS. 5A-5B (collectively "FIG. 5") are a flow diagram presenting an example method for enabling sharing a cross view of visual content in response to establishing a secure peer-to-peer connection between two communication devices, according to one or more embodiments.
Figure 5B:
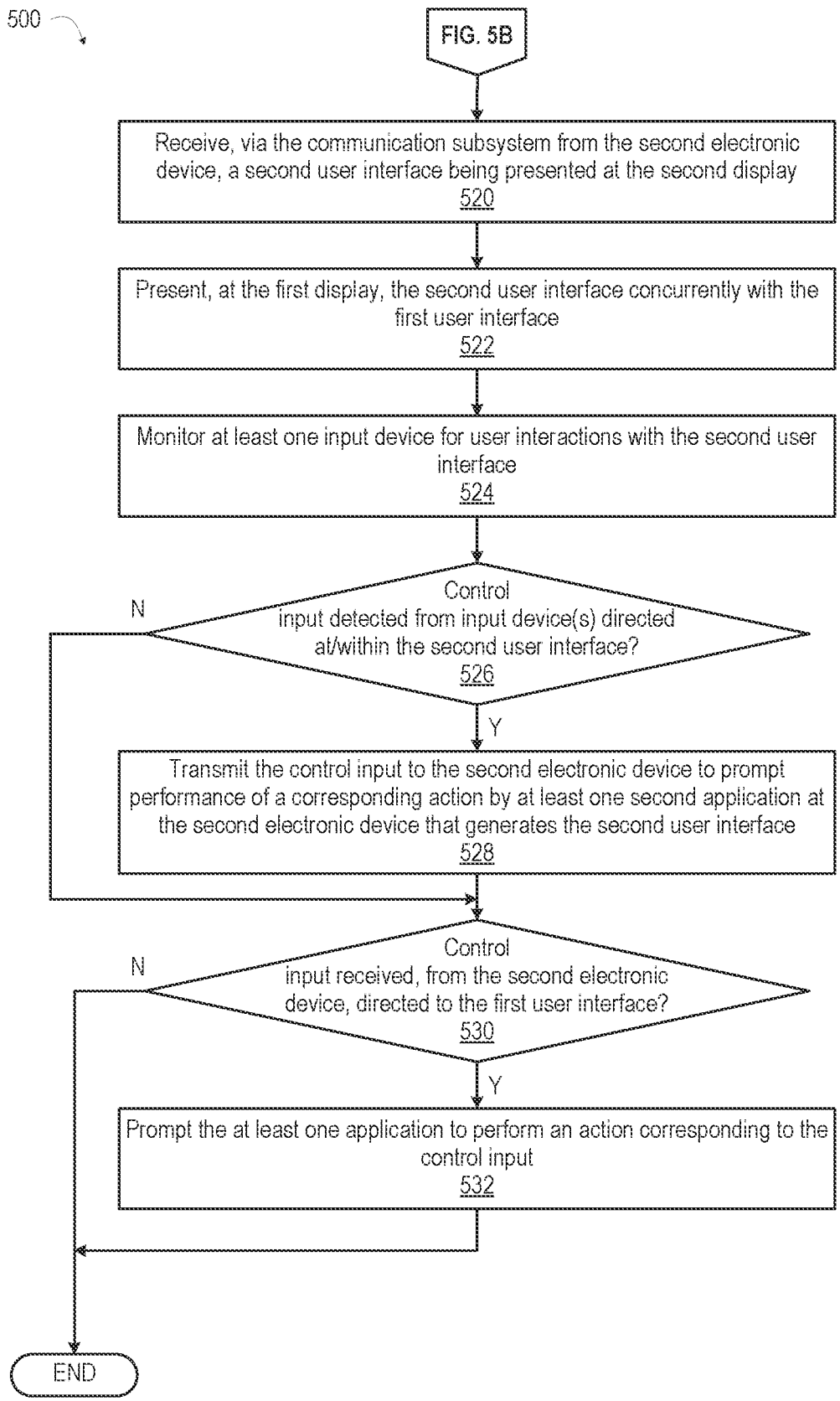

FIGS. 5A-5B (collectively "FIG. 5") are a flow diagram presenting example method 500 for automatically selecting cross-view screen sharing for a secure peer-to-peer application. The description of method 500 (FIGS. 5A-5B) is provided with general reference to the specific components illustrated within the preceding FIGS. 1-2, 3A-3B and 4A-4B. Specific components referenced in method 500 (FIGS. 5A-5B) may be identical or similar to components of the same name used in describing preceding FIGS. 1-2, 3A-3B and 4A-4B. In one or more embodiments, controller 105 configures communication device 101 (FIG. 1) or UE 101a (FIGS. 2, 3A-3B and 4A-4B) to provide the described functionality of method 500 (FIGS. 5A-5B).

With reference to FIG. 5A, method 500 includes configuring a transceiver of an electronic device to discover one or more trusted peer devices that are in proximity to the electronic device (block 502). Method 500 includes wirelessly receiving, via the communication subsystem, an identifying signal from a second electronic device (block 504). Method 500 includes establishing a secure peer-to-peer communication session in response to identifying the second electronic device as a trusted peer (block 506). Method 500 includes executing, by a processor of the first electronic device, at least one application to present a first user interface at a first display of the first electronic device (block 508). Method 500 includes presenting a cross-view mode control at the first display (block 510). Method 500 includes monitoring at least one input device for user selection of the cross-view mode control while in a previously selected or default non-shared view mode (block 512). Method 500 includes determining whether an input to the cross-view mode control is received (decision block 514). In response to determining that an input to the cross-view mode control is not received, method 500 returns to block 514. In response to determining that an input to the cross-view mode control is received, method 500 includes enabling the cross-view mode of sharing of user interface content between the first and the second electronic devices across the secure peer-to-peer connection (block 516). Method 500 includes transmitting a duplicate of the first user interface to the second electronic device for presenting at the second display (block 518). Then method 500 proceeds to block 520 of FIG. 5B.

With reference to FIG. 5B, method 500 includes receiving, via the communication subsystem from the second electronic device, a second user interface being presented at the second display (block 520). Method 500 includes presenting, at the first display, the second user interface concurrently with the first user interface (block 522). Method 500 includes monitoring at least one input device for user interactions with the second user interface (block 524). Method 500 includes determining whether a control input is detected from the at least one input device directed at/within the second user interface (decision block 526). In response to detecting a control input from the at least one input device directed at/within the second user interface, method 500 includes transmitting the control input to the second electronic device to prompt performance of a corresponding action by at least one second application at the second electronic device (block 528). In response to not detecting a control input from the at least one input device directed at/within the second user interface or after block 528, method 500 includes determining whether a control input is received, via the communication subsystem from the second electronic device, directed to the first user interface being presented at the second display (decision block 530). In response to determining that a control input is received, via the communication subsystem from the second electronic device, directed to the first user interface being presented at the second display, method 500 includes prompting the at least one application to perform an action corresponding to the control input, the control input provided by at least one second input device at the second electronic device (block 532). In response to determining that a control input is not received, via the communication subsystem from the second electronic device, directed to the first user interface being presented at the second display in decision block 530 or after block 532, method 500 ends.

In one or more embodiments, method 500 further includes identifying one of the first and the second user interface as a main background presentation of a picture-in-picture (PIP) format. Method 500 includes identifying another one of the first and the second user interface as an insert foreground presentation of the PIP format. Method 500 includes presenting the first and the second user interfaces via the PIP format at the first display. In one or more particular embodiments, method 500 further includes monitoring at least one input device for user selection/input of a PIP switch function. In response to detecting the user input, method 500 includes switching the first and the second user interfaces between the main background presentation and the insert foreground presentation.

In one or more embodiments, method 500 further includes arranging the first and the second user interfaces for concurrent (e.g., side-by-side) presentation in response to determining that the first display has a size characteristic greater than a size threshold for simultaneous viewing. In one or more particular embodiments, method 500 further includes cascading the first and the second user interfaces for selective viewing in response to determining that the first display has a size characteristic that is less than or equal to a size threshold. The size characteristic may be defined at least in part as a minimum size for legibly presenting text or graphical images. The size characteristic may be defined at least in part on physical dimensions of a display. The size characteristic may be defined at least in part on resolution capabilities of the display.

Figure 6:
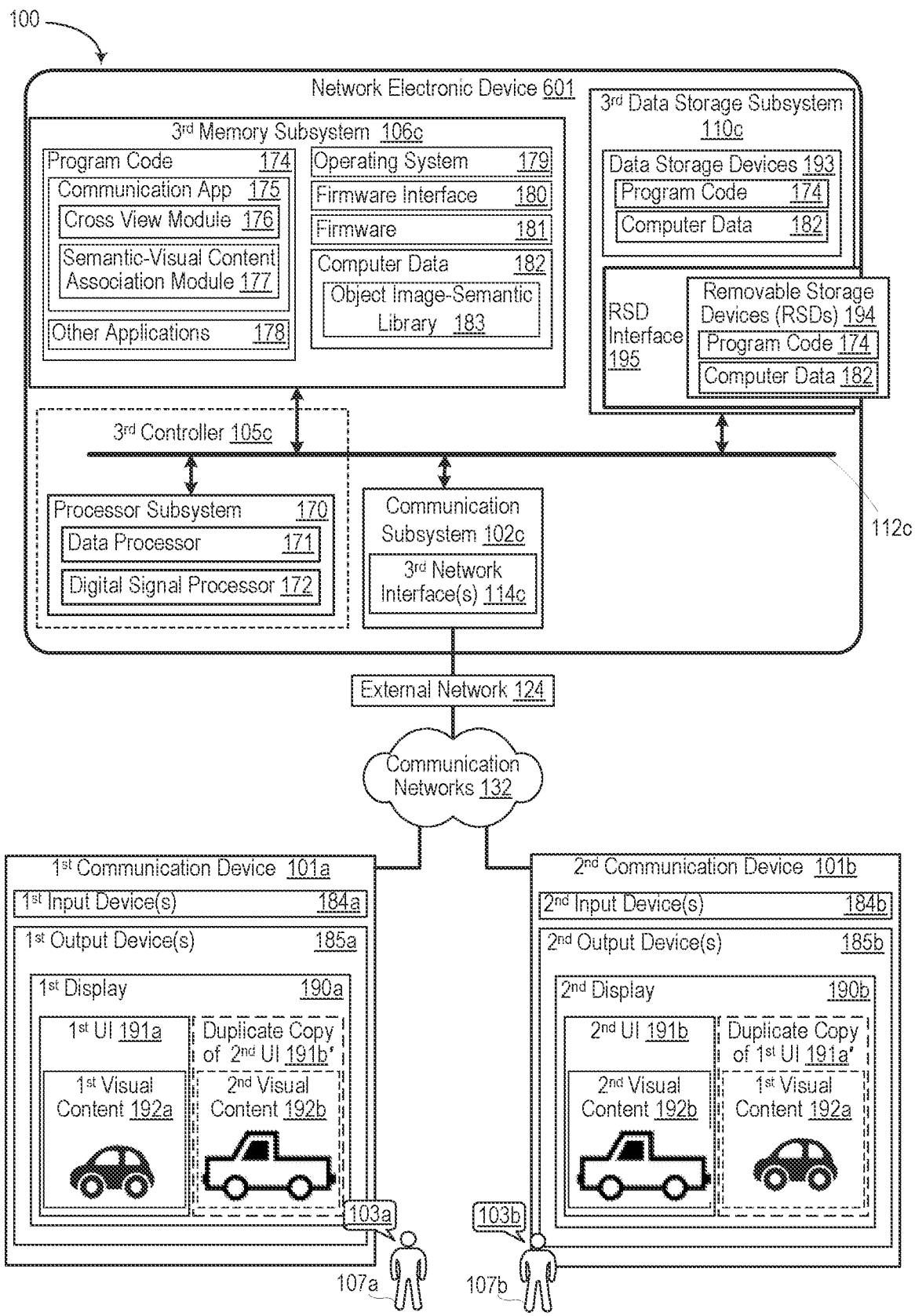
FIG. 6 is a block diagram of a network device that facilitates sharing cross views of visual content between two communication devices via an external network, according to one or more embodiments.

FIG. 6 is a block diagram of network electronic device 601 that facilitates sharing cross views of visual content between at least first and second communication devices 101a-101b via external network 124. Network electronic device 601 may have identical or similar components and functionality as described above for communication device 101 of FIG. 1. In one or more embodiments, network electronic device 601 includes third communication subsystem 102c, third controller 105c, third memory subsystem 106c, and third data storage subsystem 110c. Third controller 105c is communicatively connected to third communication subsystem 102c, third memory subsystem 106c, and third data storage subsystem 110c via third system interlink 112c. In an example, third communication subsystem 102c is connectable to communication network 132. Network electronic device 601 may be a network server having third communication subsystem 102c that omits wireless and cellular capabilities, being communicatively coupled to external network 124 via third network interface(s) 114c and network cable 120. In an example, first and second communication devices 101a-101b can be wirelessly connected to communication networks 132 that are communicatively connected to external networks 124.

According to aspects of the present disclosure, third controller 105c establishes, via third communication subsystem 102c and communication network 132, a communication session between first and second electronic devices, such as first communication device 101a and second communication device 101b. During the communication session, third controller 105c of network electronic device 601 communicates, to second communication device 101b, first semantic input received by first input device(s) 184a of first communication device 101a for presenting by second output device(s) 185b of second communication device 101b. Third controller 105c identifies first visual content 192a selected via first input device(s) 184a and presented by first user interface 191a via first output device(s) 185a of first communication device 101a. In response to determining that first semantic input 103a is associated with first visual content 192a, third controller 105c communicates first user interface 191a to second communication device 101b for presenting first user interface 191a by second output device(s) 185b in addition to content locally presented on second output device(s) 185b. During the communication session, third controller 105c communicates second semantic input 103b by second participant 107b received by second input device(s) 184b of second communication device 101b to first communication device 101a for presenting by first output device(s) 185a to first participant 107a. Third controller 105c identifies second visual content 192b selected by second participant 107b and presented by second user interface 191b via second output device(s) 185b of second communication device 101b. In response to determining that second semantic input 103b is associated with second visual content 192b indicating a cross-view context, third controller 105c communicates second user interface 191b to first communication device for presenting by first output device(s) 185b concurrently with first user interface 191a.

Figure 7A:
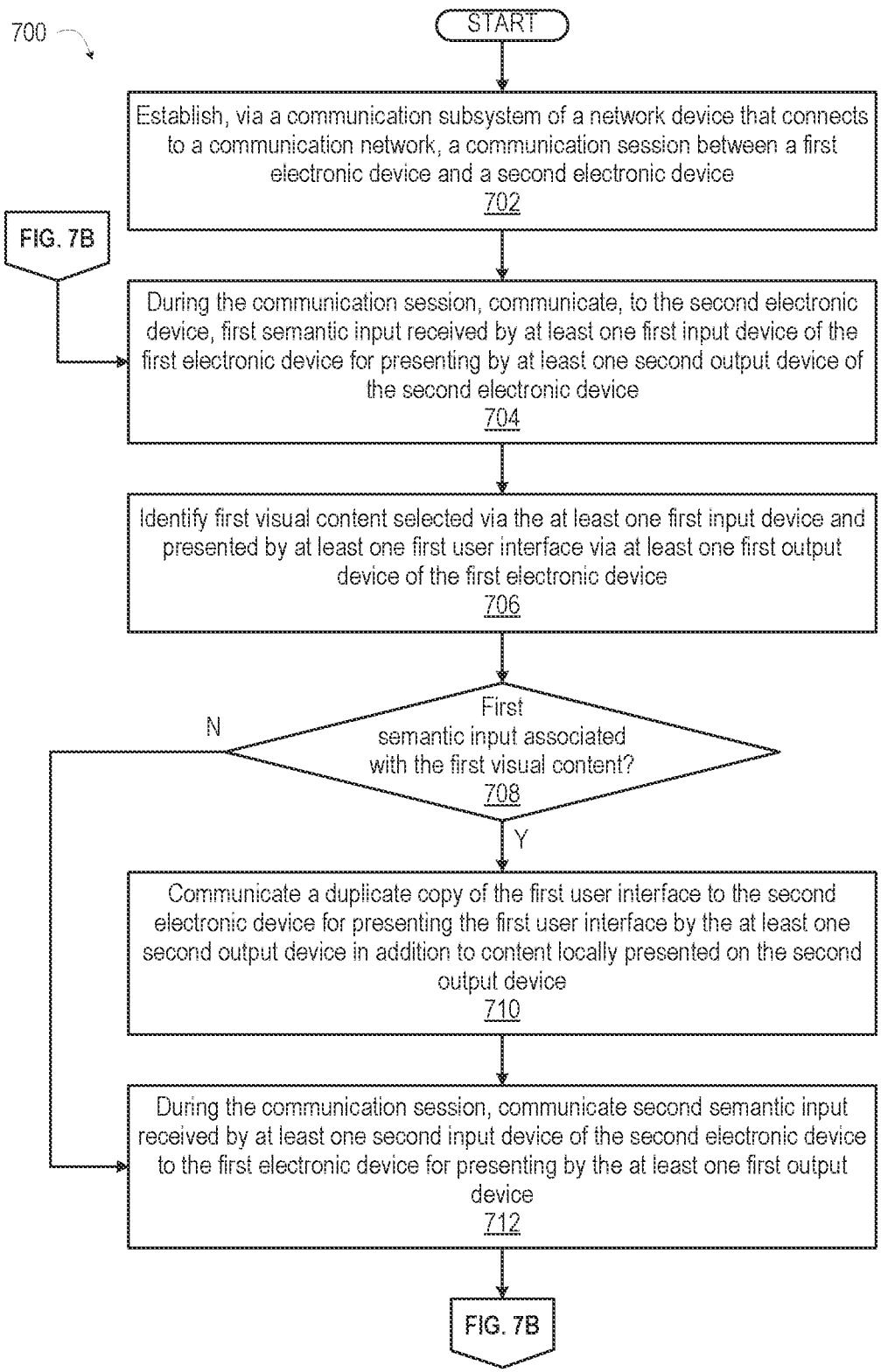
FIGS. 7A-7B (collectively "FIG. 7") are a flow diagram presenting an example method that automates sharing of visual content from one or both communication devices in response to an association between semantic and visual content, according to one or more embodiments.
Figure 7B:
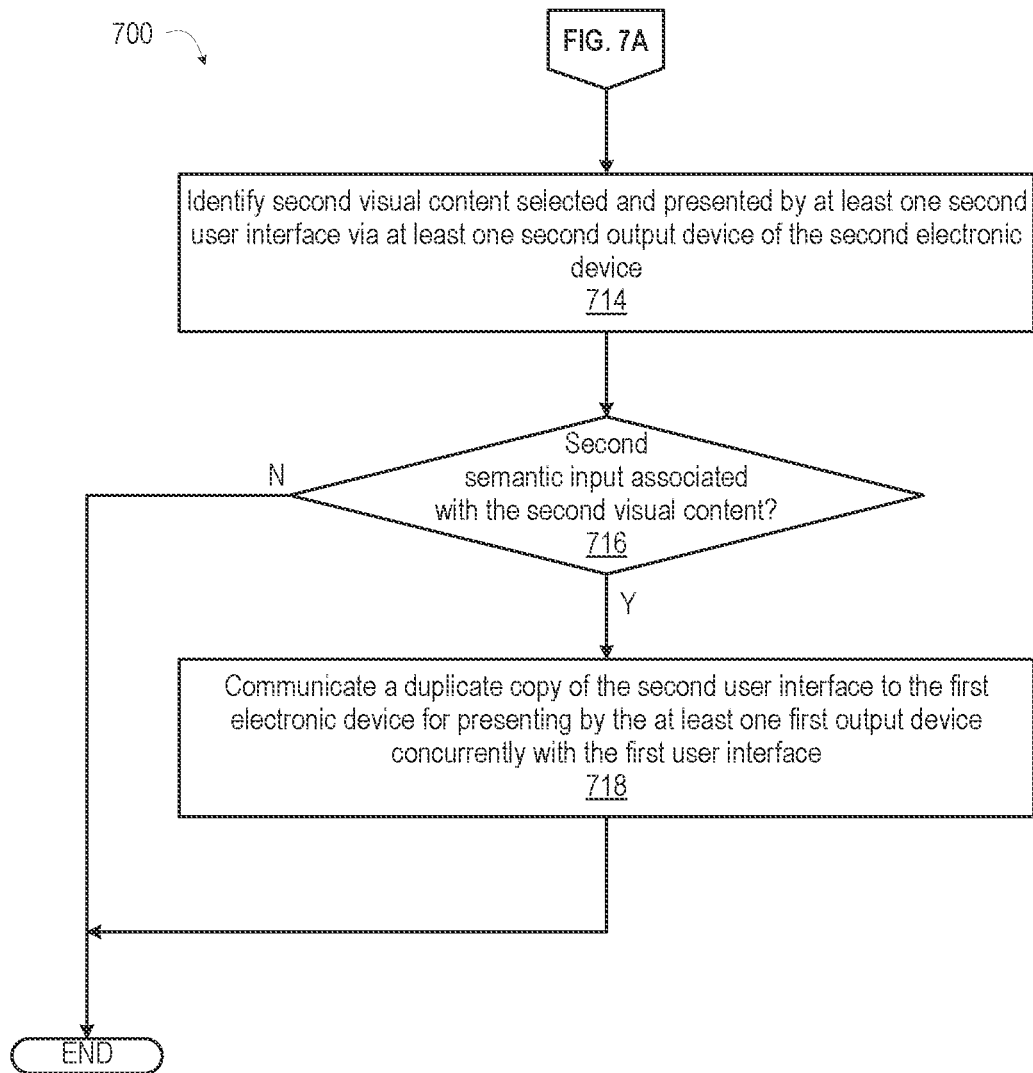
Figure 8:
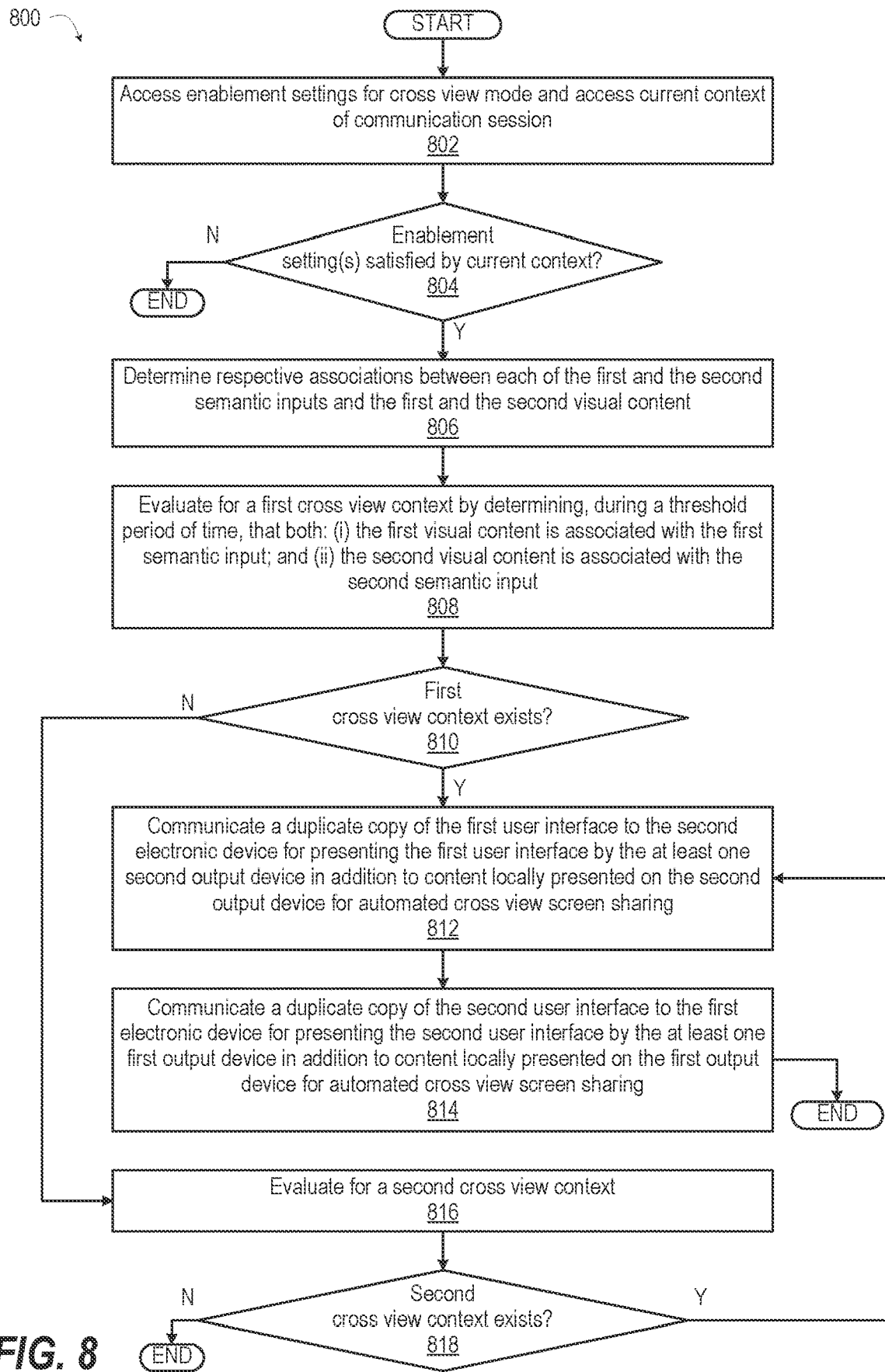
FIG. 8 is a flow diagram presenting an example method that augments the method of FIG. 7 by automating sharing of cross view visual content in additional scenarios, according to one or more embodiments.

FIGS. 7A-7B (collectively "FIG. 7") are a flow diagram presenting method 700 that automates sharing of visual content from one or both communication devices in response to an association between semantic and visual content. FIG. 8 is a flow diagram presenting method 800 that augments the method of FIGS. 7A-7B by automating sharing of cross view visual content in additional scenarios. The description of method 700 (FIGS. 7A-7B) and method 800 (FIG. 8) is provided with general reference to the specific components illustrated within the preceding FIGS. 1-2, 3A-3B, 4A-4B, and 6 Specific components referenced in method 700 (FIGS. 7A-7B) and method 800 (FIG. 8) may be identical or similar to components of the same name used in describing preceding FIGS. 1-2, 3A-3B, 4A-4B and 6. In one or more embodiments, third controller 105c configures network electronic device 601 (FIG. 6) to provide the described functionality of method 700 (FIGS. 7A-7B) and method 800 (FIG. 8).

With reference to FIG. 7A, method 700 includes establishing, via a communication subsystem of a network device that connects to a communication network, a communication session between a first electronic device and a second electronic device (block 702). Method 700 includes, during the communication session, communicating, to the second electronic device, first semantic input received by at least one first input device of the first electronic device for presenting by at least one second output device of the second electronic device (block 704). Method 700 includes identifying first visual content selected via the at least one first input device and presented by at least one first user interface via at least one first output device of the first electronic device (block 706). Method 700 includes determining whether the first semantic input is associated with the first visual content (decision block 708). In response to determining that the first semantic input is associated with the first visual content, method 700 includes communicating a duplicate copy of the first user interface to the second electronic device for presenting the first user interface by the at least one second output device in addition to content locally presented on the second output device (block 710). In response to determining that the first semantic input is not associated with the first visual content in decision block 708 or after block 710, method 700 includes, during the communication session, communicating second semantic input as part of a conversation or discussion that is received by at least one second input device of the second electronic device to the first electronic device for presenting by the at least one first output device (block 712). In one embodiment, a second participant speaks, types, or gestures the second semantic input to the second electronic device for transmitting to the first electronic device, which presents the second semantic input to the first participant. Then method 700 proceeds to block 714 of FIG. 7B.

With reference to FIG. 7B, method 700 includes identifying second visual content selected and presented by at least one second user interface via at least one second output device of the second electronic device (block 714). Method 700 includes determining whether the second semantic input is associated with the second visual content (decision block 716). A conversation or discussion that includes the second input is associated with the second visual content. The association indicates that a second participant is discussing what is being presented as the second visual content (i.e., a cross-view sharing context). In response to determining that the second semantic input is associated with the second visual content, indicating a cross-view sharing context, method 700 includes communicating a duplicate copy of the second user interface to the first electronic device for presenting by the at least one first output device concurrently with the first user interface (block 718). In response to determining that the second semantic input is associated with the second visual content, indicating a cross-view context, in decision block 716 or after block 718, method 700 ends.

With reference to FIG. 8, method 800 includes accessing and identifying each of one or more enablement settings for cross view mode and accessing current context of communication session (block 802). In an example, a first enablement setting may require that a secure communication session is established between trusted peers (e.g., secure P2P connection, secure connection over a communication network, etc.). In another example, a second enablement setting may require that both communication devices be identified as using an identical or complementary communication application that has a capacity to support a cross-view mode. In an additional example, a third enablement setting may require that both communication devices be pre-approved for cross-view mode. A user may turn on and turn off automatic cross-view mode, for instance, when viewing private content during a communication session. Method 800 includes determining whether the one or more enablement settings are satisfied by the current context of the communication session (decision block 804). In response to determining that the one or more enablement settings are not satisfied, method 800 ends. In response to determining that that the one or more enablement settings are satisfied, method 800 includes determining respective associations between each of the first and the second semantic inputs and the first and the second visual content (block 806).

Method 800 includes evaluating for a first cross view context by determining, during a threshold period of time, that both: (i) the first visual content is associated with the first semantic input; and (ii) the second visual content is associated with the second semantic input (block 808). In this first cross-view context, the first participant is discussing what the first participant is viewing and/or the second participant is discussing what the second participant is viewing. Method 800 includes determining whether the first cross view context exists (decision block 810). In response to determining that the first cross view context exists, method 800 includes communicating a duplicate copy of the first user interface to the second electronic device for presenting the first user interface by the at least one second output device in addition to content locally presented on the second output device for automated cross view screen sharing (block 812). Method 800 includes communicating a duplicate copy of the second user interface to the first electronic device for presenting the second user interface by the at least one first output device in addition to content locally presented on the first output device for automated cross view screen sharing (block 814). Then method 800 ends.

In response to determining that the first cross view context does not exist in decision block 810, method 800 includes evaluating for a second cross view context (block 816). In an example, the evaluation for a second cross-view context may be based on determining, during a threshold period of time, that the first semantic input is associated with both the first and the second visual content. In another example, the evaluation for a second cross-view context may be based on determining, during a threshold period of time, that the second semantic input is associated with both the first and the second visual content. The second cross-view context is identified when the first participant is discussing both what the first participant is viewing and what the second participant is viewing. The second cross-view context is also identified when the second participant is discussing both what the first participant is viewing and what the second participant is viewing. Method 800 includes determining whether the second cross view context exists (decision block 818). In response to determining that the second cross view context exists, method 800 returns to block 812. In response to determining that the second cross view context does not exist, method 800 ends.

Figure 9:
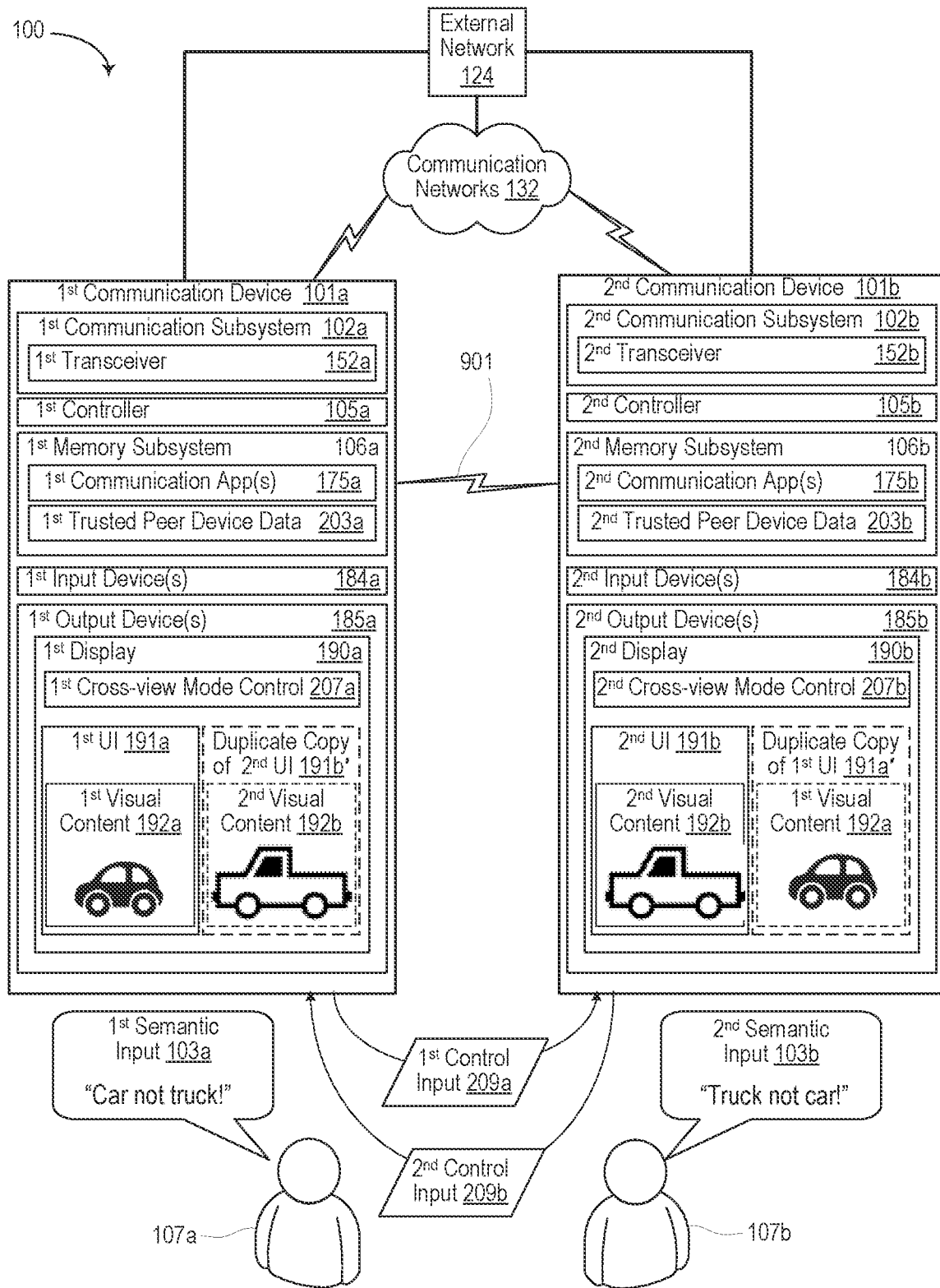
FIG. 9 depicts a functional block diagram of a communication environment including communication devices that each selectively share visual content for cross view sharing based on associations detected during exchanges of semantic content, according to one or more embodiments.

FIG. 9 depicts a functional block diagram of communication environment 100 including at least two electronic devices such as first and second communication devices 101*a*-101*b* that each selectively share visual content for cross view sharing based on associations detected during exchanges of semantic content. First controller 105a of first communication device 101a establishes, via first communication subsystem 102a, a communication session with second communication device 101b to facilitate a semantic communication such as conversation or discussion—between first communication device 101a and second communication device 101b. In an example, first and second communication devices 101a-101b are directly communicatively connected via an ad hoc wireless or a sidelink cellular link 901. In another example, first and second communication devices 101a-101b are indirectly communicated connected via external network 124 or communication networks 132. First controller 105a presents first user interface 191a via first output device(s) 185a. First user interface 191a contains first visual content 192a that is user selected via inputs received by first input device(s) 184a. First controller 105a transmits, via communication subsystem 102a to second communication device 101b, first semantic input 103a received by first input device(s) 184a. In response to associating first semantic input 103a with first visual content 192a, first controller 105a transmits first user interface 191a to second communication device 101b. First controller 105a receives, via communication subsystem 102a from second communication device 101b, second semantic input 103b entered at second communication device 101b. First controller 105a presents second semantic input 103b via first output device(s) 185a. First controller 105a determines whether second semantic input 103b is associated with first visual content 192a. In response to determining that second semantic input 103b is associated with first visual content 192a, first controller 105a transmits first user interface 191a to second communication device 101b.

Figure 10A:
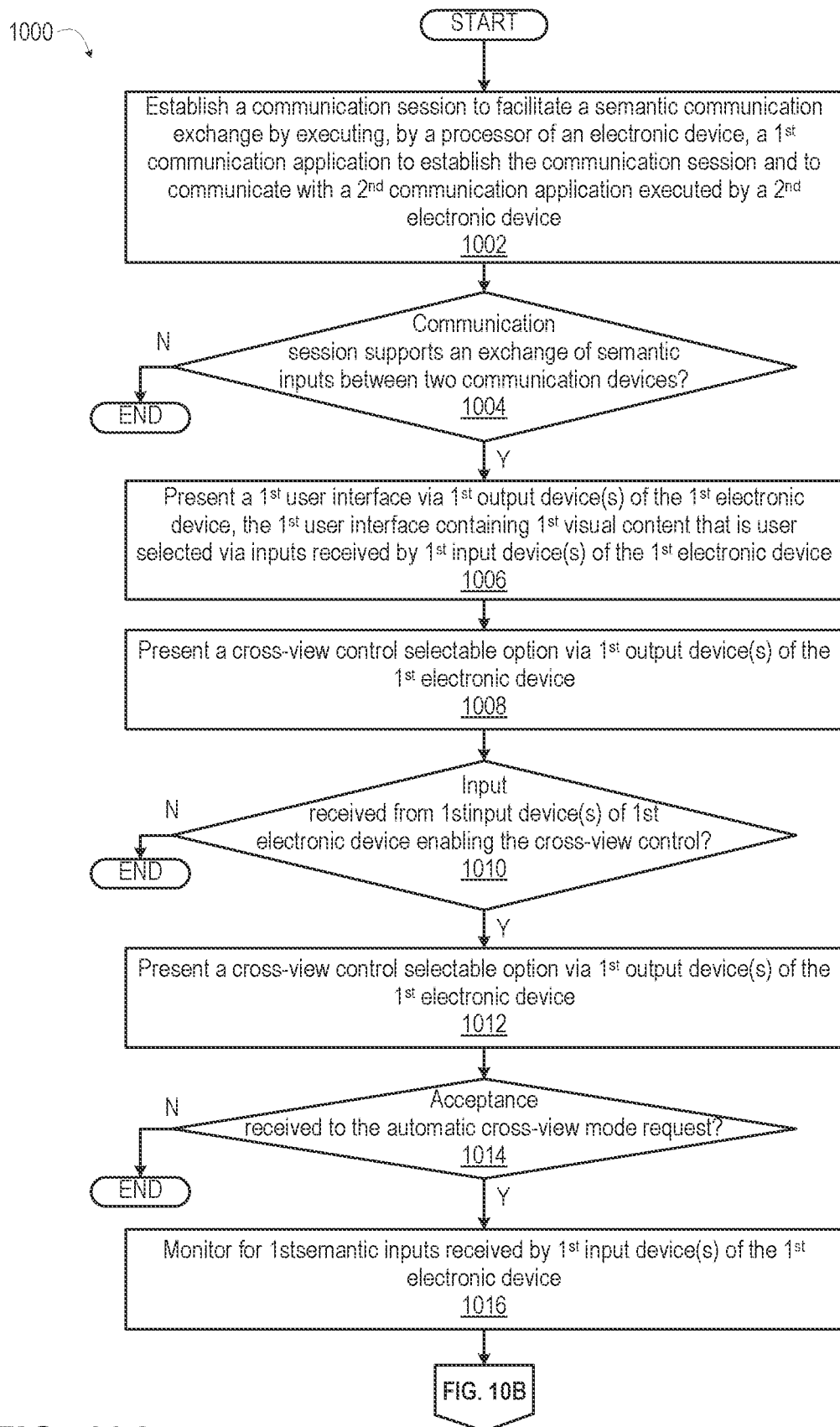
FIGS. 10A-10C (collectively "FIG. 10") are a flow diagram presenting an example method that automates sharing of visual content by a communication device with a second communication device in response to an association between semantic and/or visual content, according to one or more embodiments.
Figure 10B:
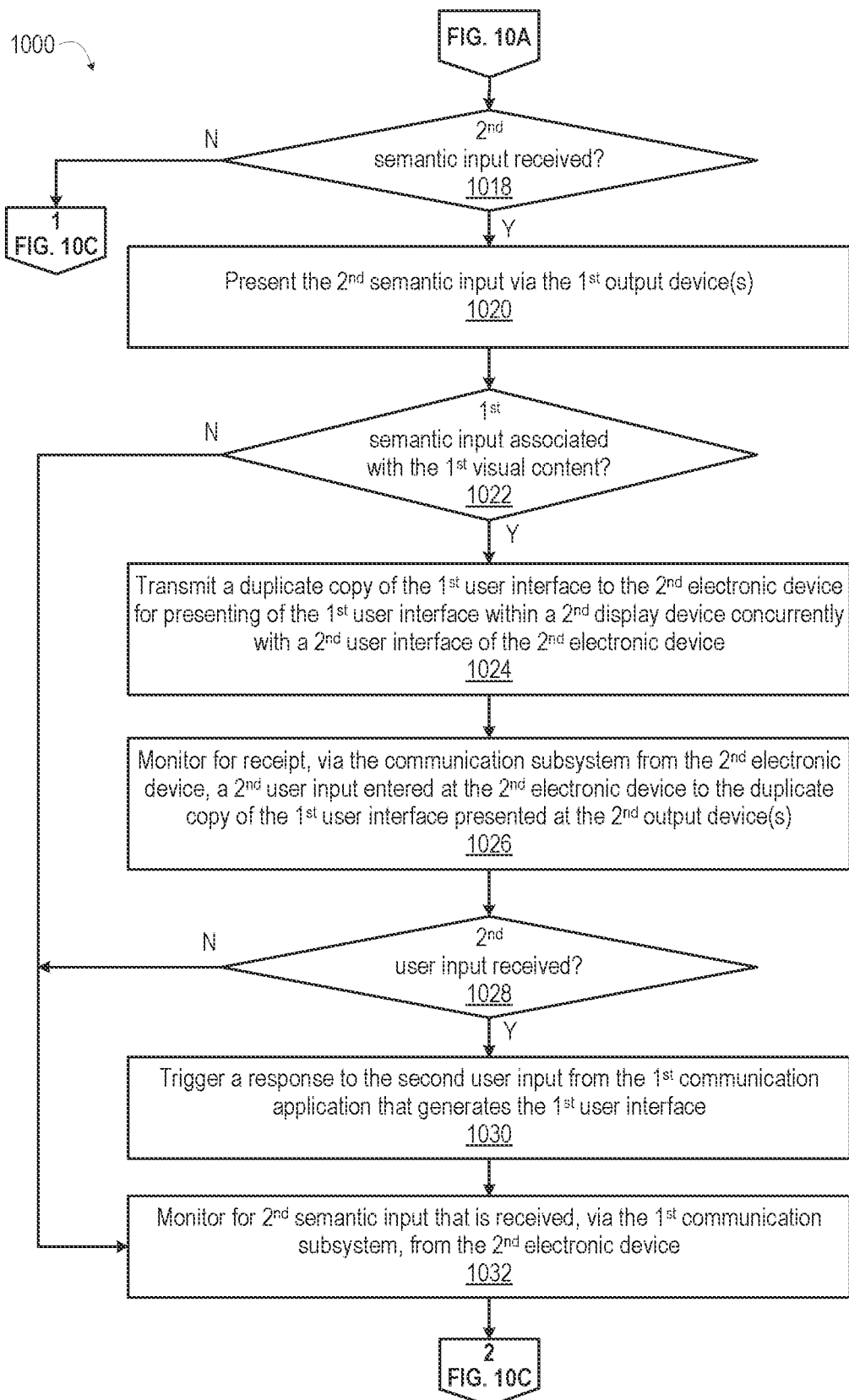
Figure 10C:
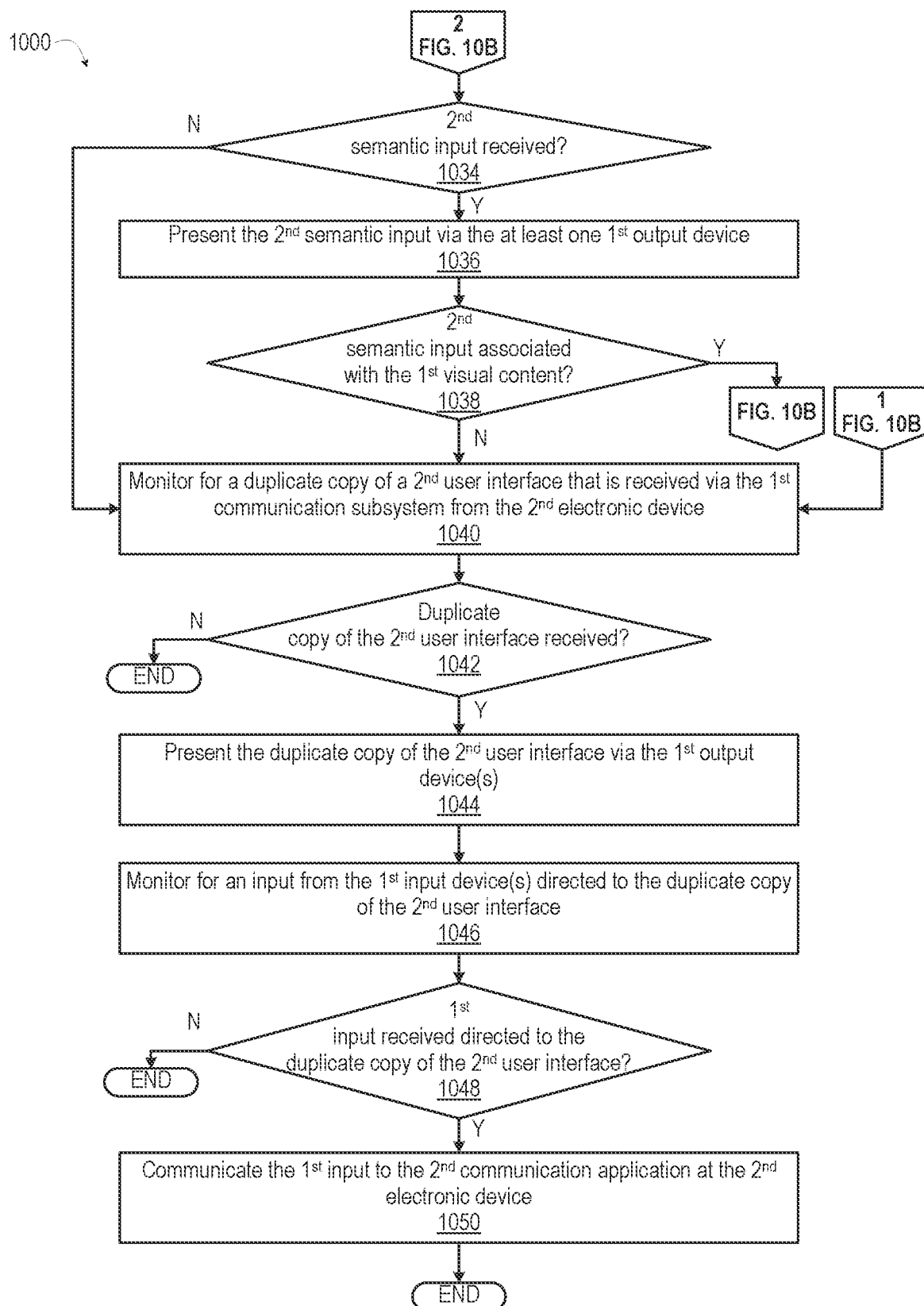

FIGS. 10A-10C (collectively "FIG. 10") are a flow diagram presenting method 1000 that automates sharing of visual content by a first communication device with a second communication device in response to an association between semantic and visual content. The description of method 1000 (FIGS. 10A-10C) is provided with general reference to the specific components illustrated within the preceding FIGS. 1-2, 3A-3B, 4A-4B, 6 and 9. Specific components referenced in method 1000 (FIGS. 10A-10C) may be identical or similar to components of the same name used in describing preceding FIGS. 1-2, 3A-3B, 4A-4B, 6 and 9. In one or more embodiments, controller 105 (FIG. 1) or controller 105a (FIG. 9) configures communication device 101 (FIG. 1) or first communication device 101a (FIG. 9) respectively to provide the described functionality of method 1000 (FIGS. 10A-10C).

With reference to FIG. 10A, method 1000 includes establishing a communication session to facilitate a semantic communication exchange by executing, by a processor of an electronic device, a first communication application to establish the communication session and to communicate with a second communication application executed by a second electronic device (block 1002). For clarity, method 1000 is described as cross-view sharing between two electronic devices. In one or more embodiments, method 1000 may be extended to doing cross-view sharing between more than two electronic devices. In an example, a copy of visual content of/on a user interface may be shared and prominently presented at the other electronic device(s) while a participant using a corresponding electronic device is an active speaker.

In one or more embodiments, the first electronic device may determine/identify cross-view sharing context and initiate cross-view sharing context in a one-sided manner based on monitoring the first and the second semantic inputs and the first visual content. The second electronic device may similarly determine/identify cross-view sharing context and initiate a second cross-view sharing context in an opposite one-sided manner based on monitoring the first and the second semantic inputs and the second visual content. Either electronic device may be disabled from entering a cross-view sharing mode and refuse to receive and present visual content from the other electronic device. For clarity, method 1000 depicts a consensus between the first and the second electronic devices that both are enabled to automatically exchange visual content in a cross-view mode before exchanging copies of user interfaces and/or visual content. In one or more embodiments, the enablement may be a predefined setting for each electronic device that is communicatively connected to the other electronic device. The predefined setting may be set by a manufacturer or distributor of each electronic device. Alternatively, or in addition, each electronic device may receive the setting, or an update to currently predefined setting, from a user of the corresponding electronic device.

Method 1000 includes presenting a first user interface via at least one first output device of the first electronic device, the first user interface containing first visual content that is user selected via inputs received by at least one first input device of the first electronic device (block 1006). Method 1000 includes determining whether the communication session supports an exchange of semantic inputs and cross-view sharing between two electronic devices (decision block 1004). In response to determining that the communication session does not support semantic inputs and cross-view sharing between two electronic devices, method 1000 ends. In response to determining that the communication session supports exchange of semantic inputs and cross-view sharing, method 1000 includes presenting a cross-view control selectable option via at least one first output device of the first electronic device (block 1008). Method 1000 includes determining whether an input is received from at least one first input device of the first electronic device enabling the cross-view control (decision block 1010). In response to determining that the input is not received enabling the cross-view control from the at least on first input device, method 1000 ends. In response to determining that the input is received enabling the cross-view control from the at least one first input device, method 1000 includes transmitting an automatic cross-view mode request, via the first communication subsystem, to the second electronic device (block 1012). Method 1000 includes determining whether acceptance is received from the second electronic device to the automatic cross-view mode request (decision block 1014). In response to determining that the acceptance is not received enabling the cross-view control from the second electronic device, method 1000 ends.

In response to determining that the acceptance enabling the cross-view control is received from the second electronic device, method 1000 includes monitoring for first semantic inputs received by at least one first input device of the first electronic device (block 1016). Method 1000 includes determining whether first semantic inputs are received (decision block 1018). In response to determining that first semantic inputs are not received, method 1000 proceeds to block 1040). In response to determining that first semantic inputs are received, method 1000 includes transmitting, via the communication subsystem to the second electronic device, the first semantic input received by the at least one first input device (block 1020). Method 1000 includes determining whether the first semantic input is associated with the first visual content (decision block 1022). In response to determining that the first semantic input is not associated with the first visual content, method 1000 proceeds to block 1032. In response to determining that the first semantic input is associated with the first visual content, method 1000 includes transmitting a duplicate copy of the first user interface to the second electronic device for presenting of the first user interface within a second display device concurrently with a second user interface of the second electronic device (block 1024). In one or more embodiments, method 1000 includes communicating a duplicate copy of the first user interface to the second electronic device based in part on identifying that the communication session is a secure communication session between trusted peers.

Method 1000 includes monitoring for receipt, via the communication subsystem from the second electronic device, a second user input entered at the second electronic device to the duplicate copy of the first user interface presented at the at least one second output device (block 1026). Method 1000 includes determining whether the second user input is received (decision block 1028). In response to determining that the second user input is received, method 1000 includes triggering a response to the second user input from the first communication application that generates the first user interface (block 1030).

In response to determining that the first semantic input is not associated with the first visual content in decision block 1022, or in response to determining that the second user input is not received in decision block 1028, or after block 1030, method 1000 includes monitoring for second semantic input that is received, via the first communication subsystem, from the second electronic device (block 1032). Method 1000 includes determining whether the second semantic input is received (decision block 1034). In response to determining that the second input is not received, method 1000 proceeds to block 1040.

In response to determining that the second input is received, method 1000 includes presenting the second semantic input via the at least one first output device (block 1036). Method 1000 includes determining whether the second semantic input is associated with the first visual content (decision block 1038). In response to determining that the second semantic input is associated with the first visual content, method 1000 returns to block 1024.

In response to determining that the second semantic input is not associated with the first visual content in decision block 1032 or after block 1034, method 1000 includes monitoring for a duplicate copy of a second user interface that is received via the first communication subsystem from the second electronic device (block 1040). Method 1000 includes determining whether the duplicate copy of the second user interface is received (decision block 1042). In response to determining that the duplicate copy of the second user interface is not received from the second electronic device, method 1000 ends. In response to determining that a duplicate copy of the second user interface is received from the second electronic device, method 1000 includes presenting the duplicate copy of the second user interface via the at least one first output device (block 1044). Method 1000 includes monitoring for an input from the at least one first input device directed to the duplicate copy of the second user interface (block 1046). Method 1000 includes determining whether a first input is received directed to the duplicate copy of the second user interface (decision block 1048). In response to determining that the first input is not received directed to the duplicate copy of the second user interface, method 1000 ends. In response to determining that the first input is received directed to the duplicate copy of the second user interface, method 1000 includes communicating the first input to the second communication application at the second electronic device (block 1050). In one or more embodiments, the second communication application responds to the input to the duplicate copy of the second user interface in the same manner as if the input was made directly to the second user interface. Then method 1000 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A network device comprising:
a communication subsystem connectable to a communication network; and
a controller communicatively connected to the communication subsystem, and which:
establishes, via the communication subsystem and the communication network, a communication session between a first electronic device and a second electronic device;
during the communication session, communicates, to the second electronic device, first semantic input received by at least one first input device of the first electronic device for presenting by at least one second output device of the second electronic device, the sematic input comprising a communication consisting of spoken, typed, or gestured words;
during the communication session, communicates second semantic input received by at least one second input device of the second electronic device to the first electronic device for presenting by at least one first output device of the first electronic device;
identifies first content selected via the at least one first input device and presented by at least one first user interface via the at least one first output device of the first electronic device;
identifies second content presented by at least one second user interface via at least the one second output device of the second electronic device;
in response to determining that the first semantic input is associated with the first content, communicates a duplicate copy of the first user interface to the second electronic device for presenting the first user interface by the at least one second output device in addition to content locally presented on the second output device; and
in response to determining, during a threshold period of time, that at least one of: (i) the first semantic input is associated with both the first and the second content; or (ii) the second semantic input is associated with both the first and the second content, which is indicative of a cross-view context, communicates a duplicate copy of the first user interface to the second electronic device.

2. The network device of claim 1, wherein the controller:
in response to determining that the second semantic input is associated with the second content indicating a next cross-view context, communicates a duplicate copy of the second user interface to the first electronic device for presenting by the at least one first output device concurrently with the first user interface.

3. The network device of claim 1, wherein the controller:
in response to determining, during the threshold period of time, that both: (i) the first content is associated with the first semantic input; and (ii) the second content is associated with the second semantic input, which indicates a next cross-view context, communicates a duplicate copy of the second user interface to the first electronic device for presenting by the at least one first output device concurrently with the first user interface.

4. The network device of claim 1, wherein the controller communicates the duplicate copy of the first user interface to the second electronic device based in part on determining that the first and the second user interfaces are presented by an identical type of application executed respectively by the first and the second electronic devices.

5. The network device of claim 1, wherein the controller communicates the duplicate copy of the first user interface to the second electronic device based in part on identifying that the communication session is a secure communication session between trusted peers.

6. The network device of claim 1, wherein prior to communicating the first user interface to the second electronic device, the controller:
presents a cross-view control selectable option via the at least one first output device; and
receives, from the at least one first input device, an input enabling or selecting the cross-view control.

7. The network device of claim 1, wherein the controller further determines that the first semantic input is associated with the first content by identifying types, characteristics, classifications and synonyms for what is being presented as visual content in order to find matches with what is being communicated as semantic inputs.

8. A method comprising:
establishing, via a communication subsystem of a network device that connects to a communication network, a communication session between a first electronic device and a second electronic device;
during the communication session, communicating, to the second electronic device, first semantic input received by at least one first input device of the first electronic device for presenting by at least one second output device of the second electronic device, the sematic input comprising a communication consisting of spoken, typed, or gestured words;
during the communication session, communicating second semantic input received by at least one second input device of the second electronic device to the first electronic device for presenting by at least one first output device of the first electronic device;
identifying first content selected via the at least one first input device and presented by at least one first user interface via the at least one first output device of the first electronic device;
identifying second content selected presented by at least one second user interface via the at least one second output device of the second electronic device;
in response to determining that the first semantic input is associated with the first content, communicating a duplicate copy of the first user interface to the second electronic device for presenting the first user interface by the at least one second output device in addition to content locally presented on the second output device; and
in response to determining, during a threshold period of time, that at least one of: (i) the first semantic input is associated with both the first and the second content; or (ii) the second semantic input is associated with both the first and the second content indicating a cross-view context, communicating a duplicate copy of the first user interface to the second electronic device.

9. The method of claim 8, further comprising:
in response to determining that the second semantic input is associated with the second content indicating a next cross-view context, communicating a duplicate copy of the second user interface to the first electronic device for presenting by the at least one first output device concurrently with the first user interface.

10. The method of claim 8, further comprising:
in response to determining, during the threshold period of time, that both: (i) the first content is associated with the first semantic input; and (ii) the second content is associated with the second semantic input indicating the cross-view context, communicating a duplicate copy of the second user interface to the first electronic device for presenting by the at least one first output device concurrently with the first user interface.

11. The method of claim 8, further comprising communicating the duplicate copy of the first user interface to the second electronic device based in part on determining that the first and the second user interfaces are presented by an identical type of application executed respectively by the first and the second electronic devices.

12. The method of claim 8, further comprising communicating the duplicate copy of the first user interface to the second electronic device based in part on identifying that the communication session is a secure communication session between trusted peers.

13. The method of claim 8, further comprising:
prior to communicating the first user interface to the second electronic device:
presenting a cross-view control selectable option via the at least one first output device; and
receiving an input enabling or selecting the cross-view control via the at least on first input device.

14. The method of claim 8, further comprising determining that the first semantic input is associated with the first content by identifying types, characteristics, classifications and synonyms for what is being presented as visual content in order to find matches with what is being communicated as semantic inputs.

15. A computer program product comprising:
a non-transitory computer readable storage device; and
program code on the computer readable storage device that when executed by a processor associated with an electronic device, the program code enables the electronic device to provide functionality of:
establishing, via a communication subsystem of a network device and a communication network, a communication session between a first electronic device and a second electronic device;
during the communication session, communicating, to the second electronic device, first semantic input received by at least one first input device of the first electronic device for presenting by at least one second output device of the second electronic device, the sematic input comprising a communication consisting of spoken, typed, or gestured words;
during the communication session, communicating second semantic input received by at least one second input device of the second electronic device to the first electronic device for presenting by at least one first output device of the first electronic device;
identifying first content selected via the at least one first input device and presented by at least one first user interface via the at least one first output device of the first electronic device;
determining that the first semantic input is associated with the first content by determining that a first participant is communicating about what is being presented as the first content on the at least one first output device of the first electronic device;
identifying second content presented by at least one second user interface via the at least one second output device of the second electronic device;
in response to determining that the first semantic input is associated with the first content, communicating a duplicate copy of the first user interface to the second electronic device for presenting the first user interface by the at least one second output device in addition to content locally presented on the second output device; and
in response to determining, during a threshold period of time, that at least one of: (i) the first semantic input is associated with both the first and the second content; or (ii) the second semantic input is associated with both the first and the second content indicating a cross-view context, communicating a duplicate copy of the first user interface to the second electronic device.

16. The computer program product of claim 15, wherein the program code enables the electronic device to provide functionality of:
in response to determining that the second semantic input is associated with the second content indicating a next cross-view context, communicating a duplicate copy of the second user interface to the first electronic device for presenting by the at least one first output device concurrently with the first user interface.

17. The computer program product of claim 15, wherein the program code enables the electronic device to provide functionality of:
in response to determining, during the threshold period of time, that both: (i) the first content is associated with the first semantic input; and (ii) the second content is associated with the second semantic input indicating a next cross-view context, communicating a duplicate copy of the second user interface to the first electronic device for presenting by the at least one first output device concurrently with the first user interface.

* * * * *